US009823863B1

(12) United States Patent
Lu et al.

(10) Patent No.: US 9,823,863 B1
(45) Date of Patent: Nov. 21, 2017

(54) SUB-BLOCKS AND META PAGES FOR MAPPING TABLE REBUILD

(71) Applicant: SK hynix memory solutions inc., San Jose, CA (US)

(72) Inventors: Hong Lu, San Jose, CA (US); Nahir Sarmicanic, San Jose, CA (US); Suneel Kumar Indupuru, Cupertino, CA (US)

(73) Assignee: SK Hynix Memory Solutions Inc., San Jose, CA (US)

( * ) Notice: Subject to any disclaimer, the term of this patent is extended or adjusted under 35 U.S.C. 154(b) by 27 days.

(21) Appl. No.: 14/714,017

(22) Filed: May 15, 2015

Related U.S. Application Data

(60) Provisional application No. 62/019,303, filed on Jun. 30, 2014.

(51) Int. Cl.
*G06F 3/06* (2006.01)
*G06F 12/02* (2006.01)

(52) U.S. Cl.
CPC ........ *G06F 3/0619* (2013.01); *G06F 3/0644* (2013.01); *G06F 3/0683* (2013.01); *G06F 12/0292* (2013.01); *G06F 2212/1016* (2013.01)

(58) Field of Classification Search
CPC .. G06F 12/0246; G06F 3/0619; G06F 3/0644; G06F 3/0683
See application file for complete search history.

(56) References Cited

U.S. PATENT DOCUMENTS

| | | | | |
|---|---|---|---|---|
| 7,032,094 B2* | 4/2006 | Muramatsu | ......... | G06F 12/0246 711/103 |
| 8,239,614 B2* | 8/2012 | Asnaashari | ......... | G06F 12/0246 711/103 |
| 8,595,409 B2* | 11/2013 | Kim | ............... | G06F 12/0246 711/103 |
| 8,819,385 B2* | 8/2014 | Barsky | ............... | G06F 12/0246 711/202 |
| 9,003,264 B1* | 4/2015 | Prins | ...................... | G06F 11/10 714/773 |
| 9,396,105 B1* | 7/2016 | Adler | .................... | G06F 3/0613 |
| 2003/0093610 A1* | 5/2003 | Lai | ...................... | G06F 12/0246 711/103 |
| 2008/0052446 A1* | 2/2008 | Lasser | ................. | G06F 12/0246 711/103 |
| 2009/0113112 A1 | 4/2009 | Ye et al. | | |
| 2009/0168525 A1* | 7/2009 | Olbrich | ............... | G06F 13/1657 365/185.11 |
| 2010/0070729 A1* | 3/2010 | Ng | ........................ | G06F 3/0617 711/166 |
| 2010/0325351 A1* | 12/2010 | Bennett | ............... | G06F 12/0246 711/103 |

(Continued)

*Primary Examiner* — Midys Rojas
*Assistant Examiner* — Khoa D Doan
(74) *Attorney, Agent, or Firm* — IP & T Group LLP

(57) ABSTRACT

Data associated with logical addresses are received where the data is to be stored on a plurality of solid state storage dies and each of the plurality of solid state storage dies is independently accessible. Metadata is generated that includes the logical addresses where the metadata and the data sum to an amount of information that is less than a maximum amount of information that can be written to the plurality of solid state storage dies in a single write operation. The metadata and the data are stored in the plurality of solid state storage dies.

17 Claims, 8 Drawing Sheets

(56) References Cited

U.S. PATENT DOCUMENTS

| | | | |
|---|---|---|---|
| 2011/0072199 A1* | 3/2011 | Reiter | G06F 13/14 |
| | | | 711/103 |
| 2011/0185112 A1* | 7/2011 | Goss | G06F 12/0246 |
| | | | 711/103 |
| 2011/0231623 A1* | 9/2011 | Goss | G06F 12/0253 |
| | | | 711/159 |
| 2012/0198123 A1* | 8/2012 | Post | G06F 11/1435 |
| | | | 711/103 |
| 2015/0043277 A1* | 2/2015 | Fitzpatrick | G11C 16/10 |
| | | | 365/185.11 |
| 2015/0178149 A1* | 6/2015 | Cai | G06F 11/108 |
| | | | 714/766 |

* cited by examiner

Format of Meta Page 0 (600)

| Logical Address for Data at Die 0, Page 0 | Logical Address for Data at Die 1, Page 0 | ... | Logical Address for Data at Die 7, Page 0 | Logical Address for Data at Die 0, Page 1 | Logical Address for Data at Die 1, Page 1 | ... | Logical Address for Data at Die 7, Page 1 |

Format of Meta Page 1 (610)

| Logical Address for Data at Die 1, Page 2 | Logical Address for Data at Die 2, Page 2 | ... | Logical Address for Data at Die 7, Page 2 | Logical Address for Data at Die 0, Page 3 | ... | Logical Address for Data at Die 6, Page 3 | Logical Address for Data at Die 7, Page 3 |

Format of Meta Page 127 (620)

| Logical Address for Data at Die 0, Page 254 | Logical Address for Data at Die 1, Page 254 | ... | Logical Address for Data at Die 7, Page 254 | Logical Address for Data at Die 0, Page 255 | ... | Logical Address for Data at Die 4, Page 255 | Logical Address for Data at Die 5, Page 255 |

FIG. 6

SUB-BLOCKS AND META PAGES FOR MAPPING TABLE REBUILD

CROSS REFERENCE TO OTHER APPLICATIONS

This application claims priority to U.S. Provisional Patent Application No. 62/019,303 entitled MULTIPLE SUB-BLOCKS AND META-PAGES DESIGN IN A SUPER-BLOCK filed Jun. 30, 2014 which is incorporated herein by reference for all purposes.

BACKGROUND OF THE INVENTION

Many types of storage systems, including solid state storage systems, manage a logical-to-physical mapping table that tracks which one or more physical addresses (e.g., the actual location on the storage media where the data is actually kept) correspond to a given logical address (e.g., provided by a host during a write instruction and referenced by the host during the corresponding read instruction). Mapping tables are often stored on volatile memory, which is unable to retain information when there is no power. During a "graceful" power down where there is sufficient advance notice, the storage system copies the mapping table from volatile memory (e.g., on the storage controller) to non-volatile memory (e.g., the storage media itself). Then, when power is restored, the mapping table is retrieved. However, during an unexpected power down, the system does not have enough advance notice to copy the mapping table in its entirety to non-volatile memory. Although techniques exist for rebuilding a logical-to-physical mapping table, improved techniques which are able to rebuild the table in a faster manner would be desirable. It would also be desirable if such techniques were applicable to highly parallel, large capacity storage systems, for example, that have multiple storage dies.

BRIEF DESCRIPTION OF THE DRAWINGS

Various embodiments of the invention are disclosed in the following detailed description and the accompanying drawings.

FIG. 6 is a diagram illustrating an embodiment of meta page formats for one striped pattern embodiment.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
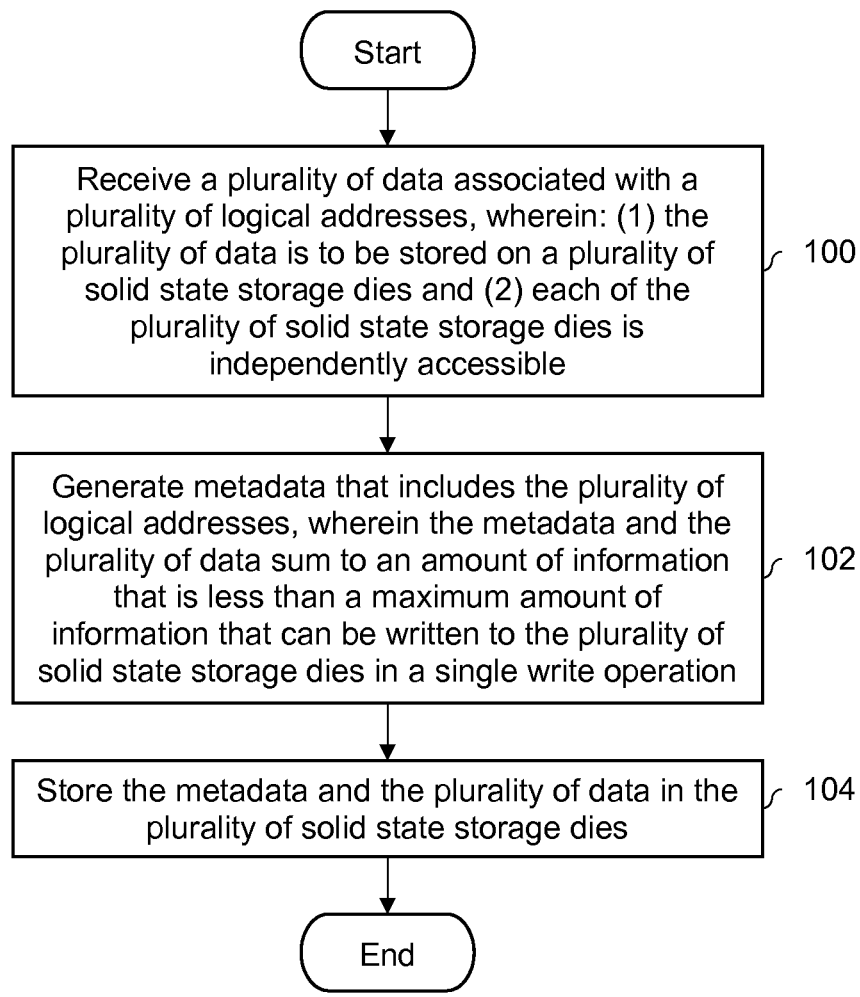
FIG. 1 is a flowchart illustrating an embodiment of a process for generating and storing metadata in a plurality of solid state storage dies.

FIG. 1 is a flowchart illustrating an embodiment of a process for generating and storing metadata in a plurality of solid state storage dies. For example, the metadata may include logical addresses associated with corresponding data and/or to be used to rebuild a logical-to-physical mapping table in an efficient manner in the event of a sudden loss of power. As described above, logical-to-physical mapping tables are often stored on volatile memory and thus need to be rebuilt after a sudden loss of power. In some embodiments, the process shown in FIG. 1 is performed by a write processor in a storage controller. It is noted that the process described in FIG. 1 may be used in combination with any appropriate table rebuild process.

At 100, a plurality of data associated with a plurality of logical addresses is received, wherein: (1) the plurality of data is to be stored on a plurality of solid state storage dies and (2) each of the plurality of solid state storage dies is independently accessible. For example, a host may send N pieces of data to a storage controller to be stored at N logical addresses. The N pieces of data may be stored in an array of M solid state storage dies, where each die is able to conduct operations (e.g., read, program/write, or erase) in parallel. For example, each storage die may have a dedicated channel between itself and a storage controller.

As will be described in more detail below, in some embodiments, each of the plurality of solid state storage dies is a multi-plane die. Multi-plane dies are able to conduct parallel operations on each of its planes, which improves the throughput or bandwidth with which the solid state storage dies can be accessed. Having multiple dies, where each die is a multi-plane die, permits massively parallelized operations to be performed (e.g., if, where needed, the locations accessed are selected to maximize the degree of parallelism offered by the plurality of multi-plane dies).

At 102, metadata that includes the plurality of logical addresses is generated, wherein the metadata and the plurality of data sum to an amount of information that is less than a maximum amount of information that can be written to the plurality of solid state storage dies in a single write operation. For example, in some systems, a super-block is the largest amount of information that can be written in a single operation (e.g., assuming that all parallelization has been selected and/or opted for). In examples described herein, a super-block comprises all of the same blocks across all dies and channels. For example, suppose each die has 2,048 blocks and the system has 8 dies/channels. Then, super-block 1 (i.e., the first super-block) will be all blocks having a block number 1 on all dies/channels. More generally, super-block i will be all blocks having a number i on all dies/channels.

As will be described in more detail below, in some embodiments, the number of logical addresses in the metadata generated at step 102 is constant. To put it another way, N (from the example above) is a constant value. Alternatively, in some embodiments, the number of logical addresses in the metadata generated at step 102 varies (i.e., N is variable).

At 104, the metadata and the plurality of data are stored in the plurality of solid state storage dies. In some embodiments, the N pieces of data (where N may be constant or vary) and the corresponding metadata are stored in the same sub-block, where a super-block is divided into multiple sub-blocks. In some embodiments, the N pieces of data and the corresponding metadata are stored in different sub-blocks. In various embodiments, the metadata is placed in various locations within a sub-block. Various embodiments are described in more detail below.

A benefit to generating and storing metadata (which includes logical addresses) in the manner described above is that if a logical-to-physical mapping table needs to be rebuilt, it can be done in a manner that is faster than other rebuild techniques. In most table rebuild processes, the majority of the processing delay comes from rebuilding the logical-to-physical address mappings from the open super-block(s) (i.e., that were not completed and closed before power was lost). For example, some other techniques fit the metadata into the last few pages of a super-block and therefore the metadata is not written until just before the super-block is closed.

Thus, when power is lost, the table rebuild process will need to read the contents of any open super-blocks (which, worst case, will be almost the entire super-block) in order to find the logical addresses (e.g., which are mixed in with and stored with the data) since a neat summary of the logical addresses (i.e., the metadata) was not written at the end of the super-block before power was lost. Note that some systems have multiple super-blocks open simultaneously and in such embodiments, multiple partially-written super-blocks must be scanned for logical addresses contained therein.

In contrast, with this technique, less information needs to be scanned in order to obtain logical addresses that are mixed in with data. For example, in one embodiment described below, each super-block is divided up into 128 sub-blocks, and metadata is stored in the last page of each sub-block. As such, during a table rebuild, only the last open sub-block would need to be parsed for logical addresses if power was lost when that sub-block was being written to. This is roughly $\frac{1}{128}^{th}$ the amount of information that would need to be scanned compared to the other technique described above.

The following figure shows one embodiment in which metadata is stored in the last page of each sub-block.

Figure 2:
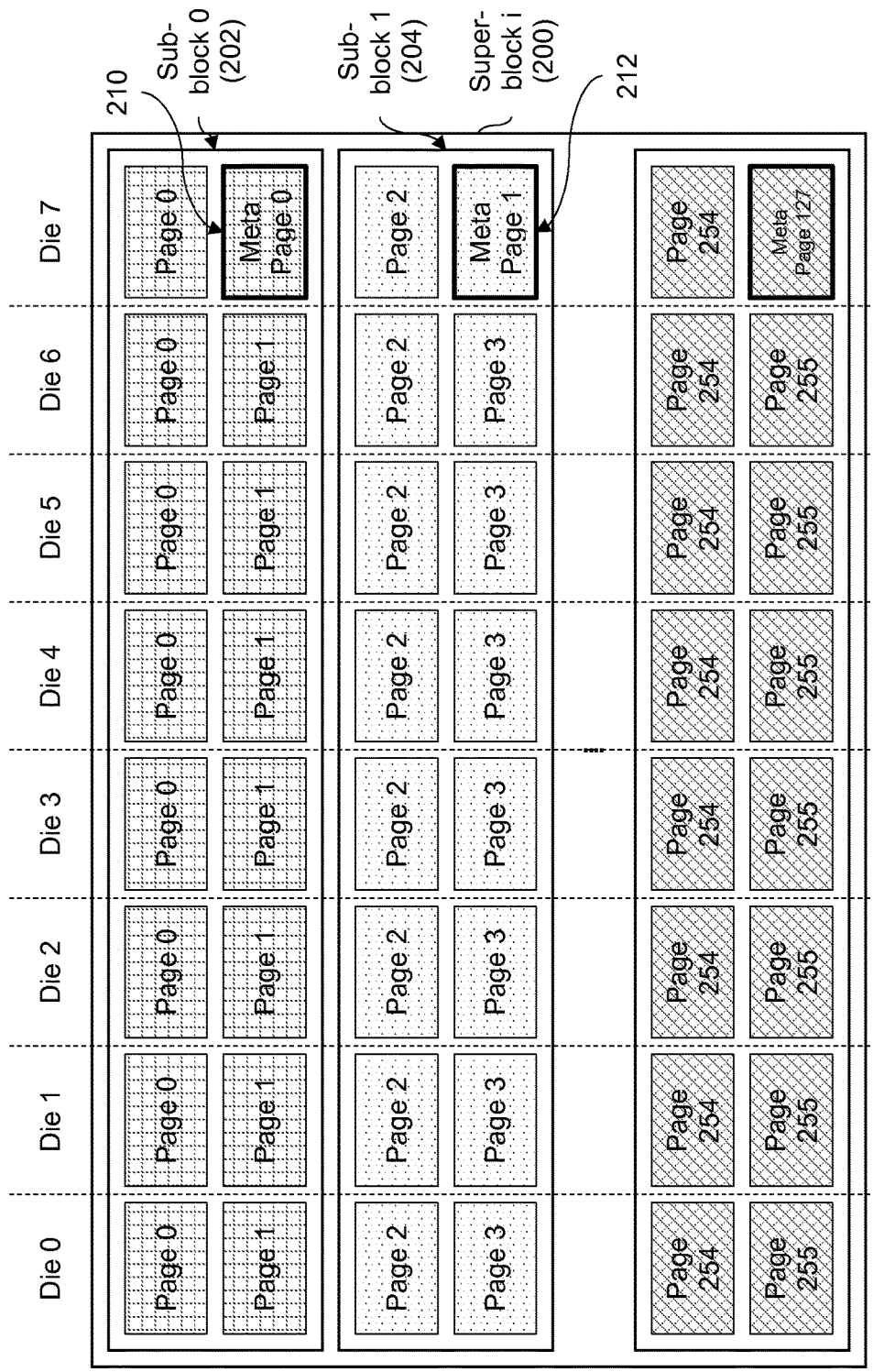
FIG. 2 is a diagram illustrating an embodiment where the metadata is stored at the end of each sub-block.

FIG. 2 is a diagram illustrating an embodiment where the metadata is stored at the end of each sub-block. Super-block i (200) is an example of a super-block, where a super-block is the largest amount of information that can be written in a single write operation (e.g., assuming that the access operation is configured to optimize or otherwise select all parallelization). Many super-blocks are able to be stored on the eight solid state storage dies and super-block 200 is merely one super-block of many. For simplicity and ease of explanation, each piece of data is the size of a page in examples described herein. Naturally, the techniques described herein are not so limited.

In this particular example there are two planes per die (e.g., because each die is a dual-plane die), 8 dies, and 128 channels per die (not shown). This permits the 2×8×128=2,048 pages shown in super-block 200 to be accessed simultaneously. Another unit or group of data often referred to is a block (not shown). In the configuration shown, each super-block includes two blocks (e.g., super-block n includes blocks 2n and 2n+1). If the dies were only a single-plane die, then a super-block would collapse to a block.

Super-block 200 is divided up into 128 sub-blocks and these sub-blocks (roughly) define boundaries for which metadata is periodically generated and stored. In this particular example, the last page of each sub-block is used to store metadata containing the logical addresses of the data stored in the rest of that sub-block. For example, meta page 0 on die 7 (210), which is the last page in sub-block 0 (202), stores the logical addresses for the data stored on the $0^{th}$ pages of dies 0-7 and on the $1^{st}$ pages of dies 0-6 (i.e., 15 pages worth of data total). (As used herein, the term "meta page" refers to a page or other location in storage that is used to store metadata (e.g., logical addresses that may be used to rebuild a logical-to-physical mapping table). In some examples described below, the terms "meta page" and "metadata" may be used interchangeably.) Returning to the figure, similarly, meta page 1 on die 7 (212), which is the last page in sub-block 1 (204), stores the logical addresses for the data stored on the $2^{nd}$ pages of dies 0-7 and on the $3^{rd}$ pages of dies 0-6. Note that in this particular example, the number of logical addresses stored in each piece of meta page is constant (i.e., N is constant and equals 15).

Suppose that power was unexpectedly lost before meta page 212 was written at the end of sub-block 204. Since a tidy summary of the logical addresses associated with the data in sub-block 204 is not available in meta page 212 when the mapping table is being rebuilt, the $2^{nd}$ pages in dies 0-7 and the $3^{rd}$ pages in dies 0-6 are read to obtain the logical addresses associated with the data stored therein. (Note that page 3 on die 7 is not of interest because it is reserved for metadata.) Reading 15 pages' worth of information is much less information than would need to be parsed using some other techniques (e.g., having to read almost all of a super-block). To put it another way, metadata is more frequently stored, such that in the event power is lost unexpectedly, less raw information needs to be parsed for logical addresses that are mixed in with the data.

A benefit to generating metadata for a sub-block's worth of data (e.g., roughly or consistently) is that the amount of time required to rebuild a mapping table remains roughly the same even as the size of a super-block increases. There is pressure to increase the size of a super-block so that the total storage capacity can be improved without sacrificing access performance (e.g., since increasing the size of a super-block increases the amount or degree of parallelism supported or otherwise offered). However, techniques that store metadata at the end of a super-block will require more time to rebuild the mapping table as the size of a super-block increases. In contrast, with the techniques described herein, the amount of time required to rebuild the mapping table remains roughly the same even as the size of a super-block increases (e.g., assuming that the size of a sub-block remains the same). For example, if the size of a super-block is increased by increasing the number of channels (but keeping the number of dies and planes the same), then the worst case delay to rebuild a logical-to-physical mapping table would increase using other techniques (e.g., where neat summaries of logical addresses are stored at the end of each super-block), but the worst case delay would remain (roughly) the same using the embodiments shown in this figure and below since the size of a sub-block would remain the same.

The following figure shows an example of the format of a meta page corresponding to the embodiment shown herein (e.g., the format of meta page 210 or 212).

Figure 3:
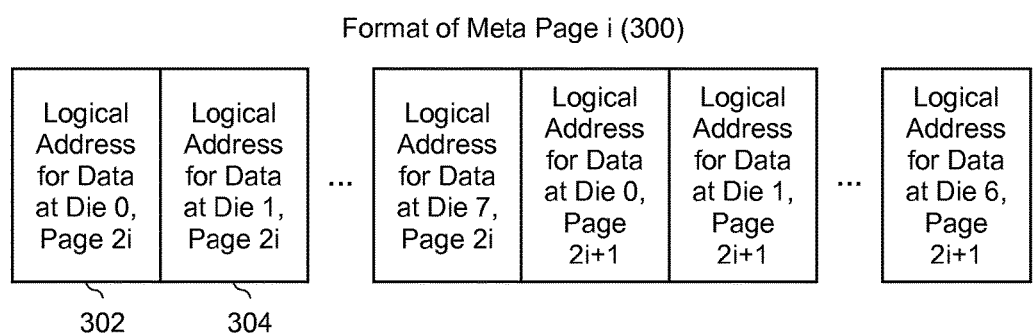
FIG. 3 is a diagram illustrating an embodiment of the format of a meta page when the meta page is stored in the last page of a sub-block and contains the logical addresses of the pages in the rest of that sub-block.

FIG. 3 is a diagram illustrating an embodiment of the format of a meta page when the meta page is stored in the last page of a sub-block and contains the logical addresses of the pages in the rest of that sub-block. FIG. 3 corresponds to the example of FIG. 2. In some embodiments, as logical addresses are received from a host, the logical addresses are added to the metadata as shown. For example, when the first piece of data is received (where that piece of data will be stored at die 0, page 2i), the corresponding logical address is placed in the first slot or field (302). When the next piece of data is received (where that piece of data will be stored at die 1, page 2i), the corresponding logical address is placed in the second slot or field (304), and so on. Note that because the metadata occupies the last page in the sub-block, there is no logical address for die 7, page 2i+1 in meta page format 300.

In this particular example, the physical addresses which correspond to the stored logical addresses can be determined or otherwise inferred from the physical address at which the meta page is stored. For example, if meta page 210 in FIG. 2 is being read, then it is known that the physical addresses (which correspond to the logical addresses stored in meta page 210) are the $0^{th}$ pages of dies 0-7 and the $1^{st}$ pages of dies 0-6. As such, in some embodiments (including this one), the physical addresses are not included in the metadata because they can be determined or otherwise inferred. Alternatively, in some embodiments the corresponding physical locations are included in the metadata.

Figure 4:
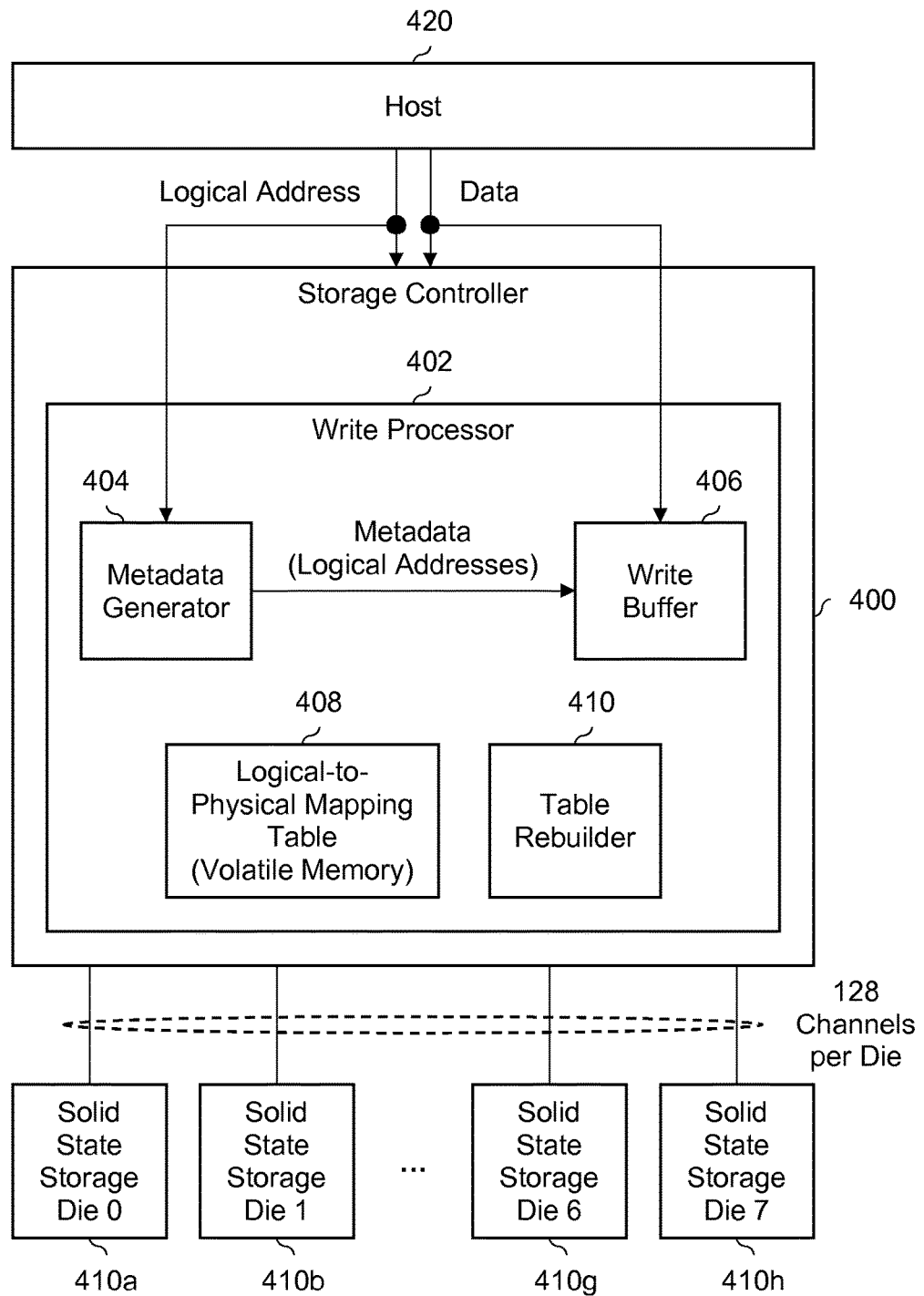
FIG. 4 is a diagram illustrating an embodiment of a solid state storage system.

FIG. 4 is a diagram illustrating an embodiment of a solid state storage system. This figure shows an example of a system which performs the process described in FIG. 1. In the example shown, host 420 sends data and a corresponding logical address to storage controller 400 (e.g., as part of a write instruction to write the data specified to the logical address specified).

Storage controller 400 includes write processor 402, which performs write operations on solid state storage dies 410a-410h in response to write instructions from host 400. Due to space limitations, a corresponding read processor is not shown. It is also noted that although this example shows eight solid state dies, the techniques described herein are not limited to that number of dies. In some embodiments, storage controller 400 is a semiconductor device, such as an application-specific integrated circuit (ASIC) or a field-programmable gate array (FPGA).

Write processor 402 includes metadata generator 404, write buffer 406, logical-to-physical mapping table 408 (which is stored on volatile memory), and table rebuilder 412. Also for space reasons, some components not directly related to the techniques described herein are not shown in this figure (e.g., error correction encoding and decoding related components are not shown herein). Metadata generator 404 generates the metadata which includes the logical addresses for data associated with a given sub-block. For example, if metadata for the data in sub-block 202 in FIG. 2 is being prepared, then metadata generator 404 would wait for 15 pages' worth of data to be sent from host 420 to storage controller 400 (e.g., where that data is to be stored in sub-block 202) and generate metadata that includes the logical addresses of those 15 pages' worth of data.

The metadata (which includes logical addresses) is passed from metadata generator 404 to write buffer 406. The write buffer is used to hold the data (e.g., received from host 420) and metadata (e.g., received from metadata generator 404) before it is written to the solid state storage die. For example, the data and metadata may be arranged in the proper order in write buffer 406 so that everything can be written to solid state storage dies 410a-410h without any subsequent rearrangement. In some embodiments, write buffer 406 is the size of a sub-block and information is written to solid state storage dies 410a-410h a sub-block at a time.

In the event of a power down, table rebuilder 412 will access solid state storage dies 410a-410h, as needed, in order to rebuild logical-to-physical mapping table 408. An example rebuild process is described in further detail below.

In addition to being able to rebuild mapping table 408 in a shorter amount of time, another benefit to the techniques described herein is that smaller write buffers may be used. For example, in some embodiments, write buffer 406 is the size of a sub-block. Some other systems may require a larger write buffer, for example, the size of a super-block. In the example of FIG. 2, a super-block is 128 times the size of a sub-block so a much smaller memory may be used to implement write buffer 406 if desired.

The meta page format described in FIGS. 2 and 3 is merely exemplary and is not intended to be limiting. The following figure describes another example where metadata is arranged using a striped pattern and thus not only is the placement of meta pages different from that shown in FIG. 2, but the corresponding logical addresses that are stored in each meta page is different from the example shown in FIG. 3. As will be described in more detail below, a striped pattern (one embodiment of which is described below) enables faster read back of metadata in the event the mapping table needs to be rebuilt.

Figure 5:
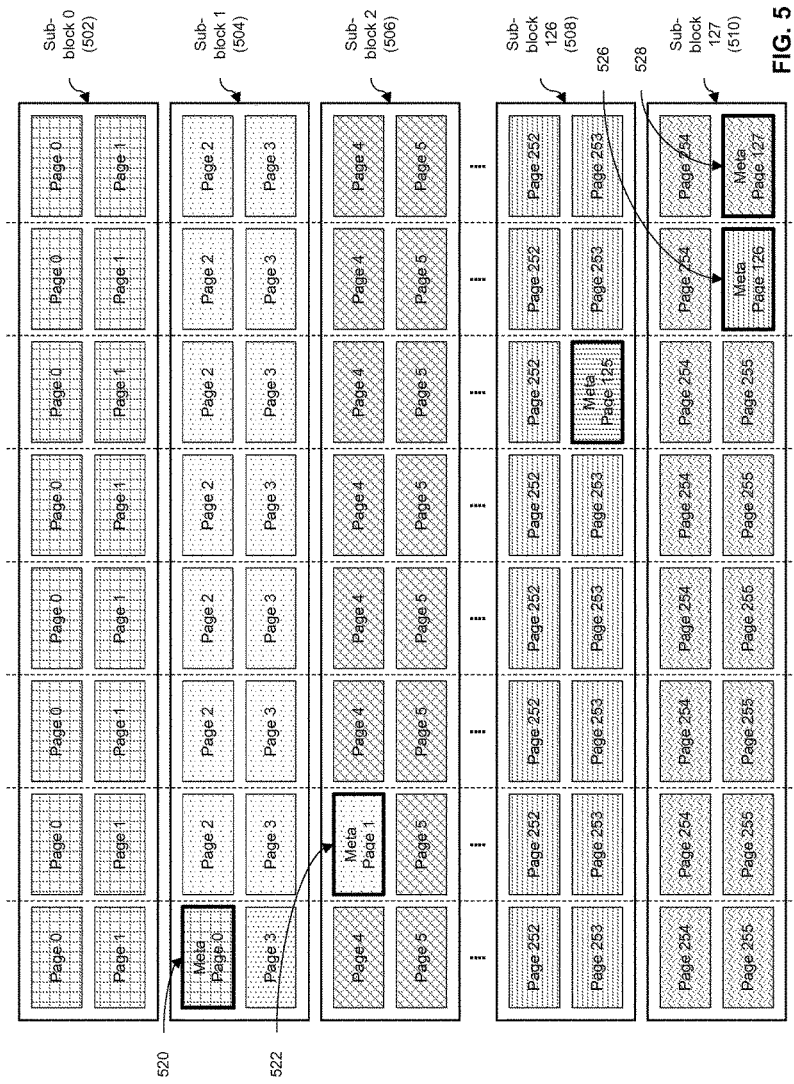
FIG. 5 is a diagram illustrating an embodiment where a meta page is stored in a next sub-block using a striped pattern.

FIG. 5 is a diagram illustrating an embodiment where a meta page is stored in a next sub-block using a striped pattern. In the example shown, the first sub-block (502) contains no meta page. The metadata for the first sub-block (i.e., meta page 0 (520)) is stored in the first page of the second sub-block (504). Since the corresponding data has 16 pages worth of data, meta page 0 (520) has logical addresses for 16 pages.

The second meta page (i.e., meta page 1 (522)) occupies page 4 of die 1 in sub-block 2 (506), even though the logical addresses contained therein are for the data stored in sub-block 1 (504). Once the meta page reaches die 7, the meta page goes back to the even page of die 0. In this example, if the pattern starts with the meta page being stored on even pages, then it will (always) be stored on even pages. This does not change (e.g., from even pages to odd pages or vice versa) even when wrapping around from the last die to the first die.

This striped pattern of storing the meta pages in the odd (even) pages of the next die, wrapping around to the even (odd) pages of the next die, and repeating continues until the last sub-block (i.e., sub-block 127 (510)) is reached. In that sub-block, meta page 126 (526) occupies the second-to-last page of sub-block 127 (510) (i.e., page 255 of die 6) and meta page 127 (528) occupies the last page of sub-block 127 (510) (i.e., page 255 of die 7). Note that meta page 127 (528) contains 14 logical addresses (e.g., corresponding to the data stored in sub-block 127 (510)) and meta page 126 (526) contains 15 logical addresses (e.g., corresponding to the data stored in sub-block 126 (508)). This is one example where the number of logical addresses stored in each meta page (e.g., N from above) varies (e.g., 16 logical addresses for the first meta page, 14 logical addresses for the last meta page, and 15 logical addresses for all other meta pages).

A striped pattern (one example of which is shown herein where the meta pages are stored on the even pages of the dies and then the odd pages of the dies) is useful because the pattern optimizes the parallelism of a potential read operation, should those meta pages need to be read back during a mapping table rebuild. More specifically, all 128 meta pages shown in FIG. 5 can be read simultaneously (i.e., using a single read operation). This further reduces the amount of time spent rebuilding a logical-to-physical mapping table.

As is shown in this figure, the placement of meta pages shown in FIG. 5 permits all of the meta pages in a super-block to be read back using a single read. This is true both if the super-block was closed and if the super-block was left open at the time of a power down (e.g., because it was interrupted in the middle of writing to that super-block). Unwritten meta pages are ignored since the storage controller knows which (meta) pages are unwritten because it tracks writes that have been performed on and/or committed to the solid state storage dies. Using a striped pattern is thus useful because the meta pages can be read back quickly and/or efficiently, specifically by placing the meta pages in such a manner that optimizes the parallelism so that read-back data contains only metadata (i.e., logical addresses) and not data. When a mapping table rebuild is being performed, the logical addresses (and their corresponding physical addresses) are of primary interest; the data that is stored at a particular physical or logical address is not necessarily of interest when a logical-to-physical mapping table is being rebuilt.

As is shown in this figure, depending upon the meta page number, the number of logical addresses included in a meta page will vary. The following figure shows some example formats for some exemplary meta pages corresponding to the embodiment shown here.

FIG. 6 is a diagram illustrating an embodiment of meta page formats for one striped pattern embodiment. FIG. 6 continues the example of FIG. 5. Diagram 600 shows the format of meta page 0 (520 in FIG. 5). As is shown in diagram 600, meta page 0 contains logical addresses for 16 pieces of data, specifically for the data stored in sub-block 0 (502) in FIG. 5. Diagram 610 shows the format of meta page 1 (522 in FIG. 5) and contains logical addresses for 15 pieces of data, specifically the data stored in sub-block 1 (504) in FIG. 5. Diagram 620 shows the format of meta page 127 (528 in FIG. 5) and contains logical addresses for 14 pieces of data, specifically the data stored in sub-block 127 (510) in FIG. 5.

Returning to FIG. 4, in embodiments where the meta page layout shown in FIG. 5 is used, metadata generator 404 will need to know the meta page number (e.g., ranging from 0 to 127 in the example of FIG. 5) in order to properly generate the metadata since the number of logical addresses contained in a meta page varies depending upon the meta page number (e.g., 14, 15, or 16 logical addresses in the example of FIG. 5). The following figure shows an example of a process performed by metadata generator 404 when the meta page layout shown in FIG. 5 is used.

Figure 7:
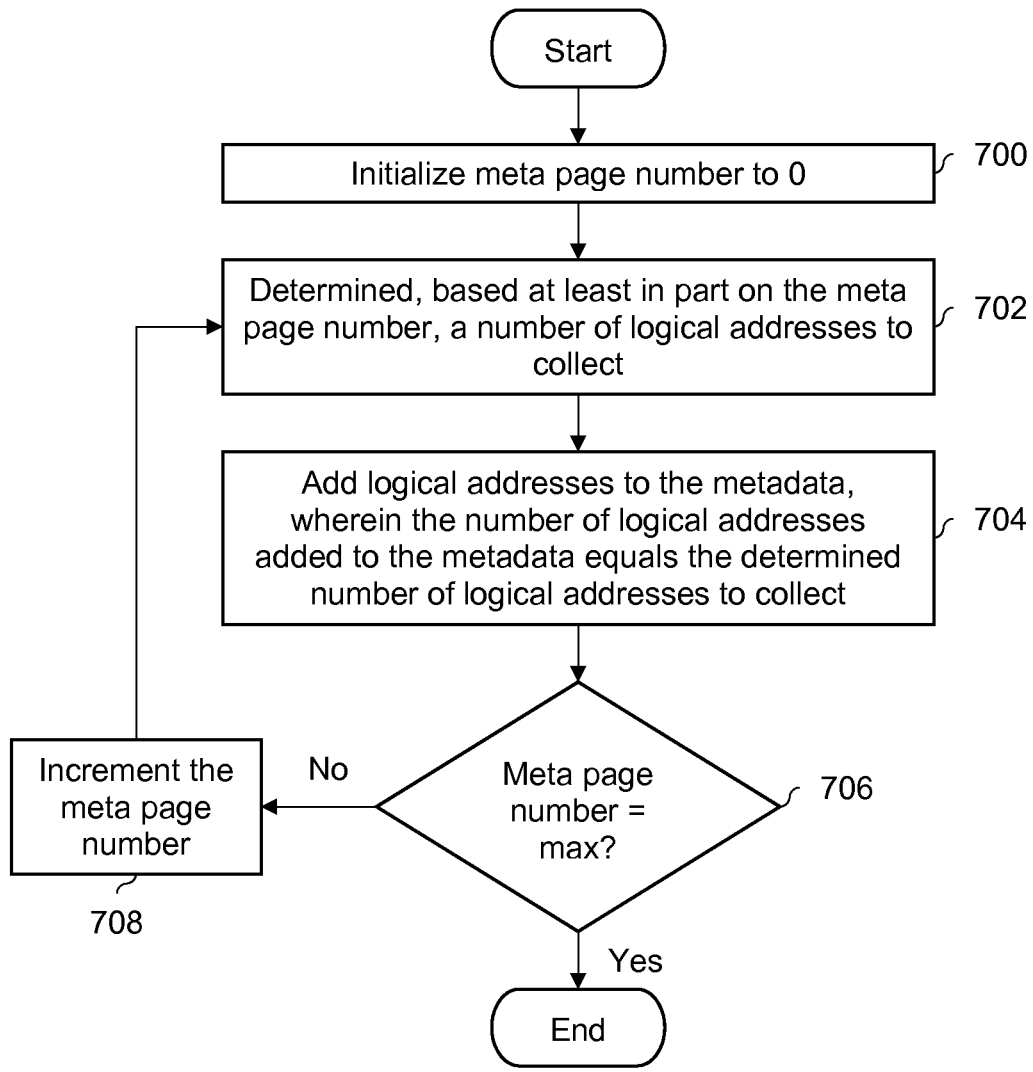
FIG. 7 is a flowchart illustrating an embodiment of a process for generating metadata when metadata is stored in a next sub-block (where applicable) and a striped pattern is used.

FIG. 7 is a flowchart illustrating an embodiment of a process for generating metadata when metadata is stored in a next sub-block (where applicable) and a striped pattern is used. FIG. 7 shows one example of the process performed by metadata generator 404 in FIG. 4 when the meta page layout shown in FIG. 5 is used. In this example, the process generates meta pages for a single super-block. Naturally, the process may be repeated for each super-block as needed. In the context of FIG. 1, in some embodiments the process shown in FIG. 7 is performed as part of step 102.

At 700, a meta page number is initialized to 0. For example, in FIG. 5, meta page 0 (520) will be generated by this iteration of the process where the meta page number is set to 0.

At 702, a number of logical addresses to collect is determined based at least in part on the meta page number. For example, in FIG. 5, when the meta page number is 0, 16 logical addresses are collected. When the meta page number is 127, 14 logical addresses are collected. For all other meta page numbers, 15 logical addresses are collected. Since the most common case is to collect 15 logical addresses (in this example at least), in some embodiments, the default option is to collect 15 logical addresses, unless the meta page number is 0 or the meta page number is 127. In some embodiments a lookup table is used.

At 704, logical addresses are added to the metadata, wherein the number of logical addresses added to the metadata equals the determined number of logical addresses to collect. For example, in FIG. 4, metadata generator 404 collects logical addresses sent from host 420 to storage controller 400 (e.g., as part of a write instruction). Metadata generator 404 will collect the number of logical addresses determined at step 702 (e.g., 14, 15, or 16 in the example of FIG. 5).

At 706, it is determined if the meta page number equals a maximum meta page number. For example, in FIG. 5, the maximum meta page number is 127. If it is determined at step 706 that the maximum has been reached, the process ends. Otherwise, the meta page number is incremented at 708. The process then determines the number of logical addresses to collect based on the new meta page number at 702.

Returning to FIG. 4, in embodiments where the meta page layout shown in FIG. 5 is used, write buffer 406 will need to know the meta page number in order to place the metadata in the proper location (e.g., within write buffer 406). The following figure shows an example of a process performed by write buffer 406 when the meta page layout shown in FIG. 5 is used. Although not shown in FIG. 4, in some embodiments, with each complete meta page that is exchanged between metadata generator 404 and write buffer 406, metadata generator 404 gives the corresponding meta page number to write buffer 406 so that write buffer 406 can properly place that meta page within the write buffer.

Figure 8:
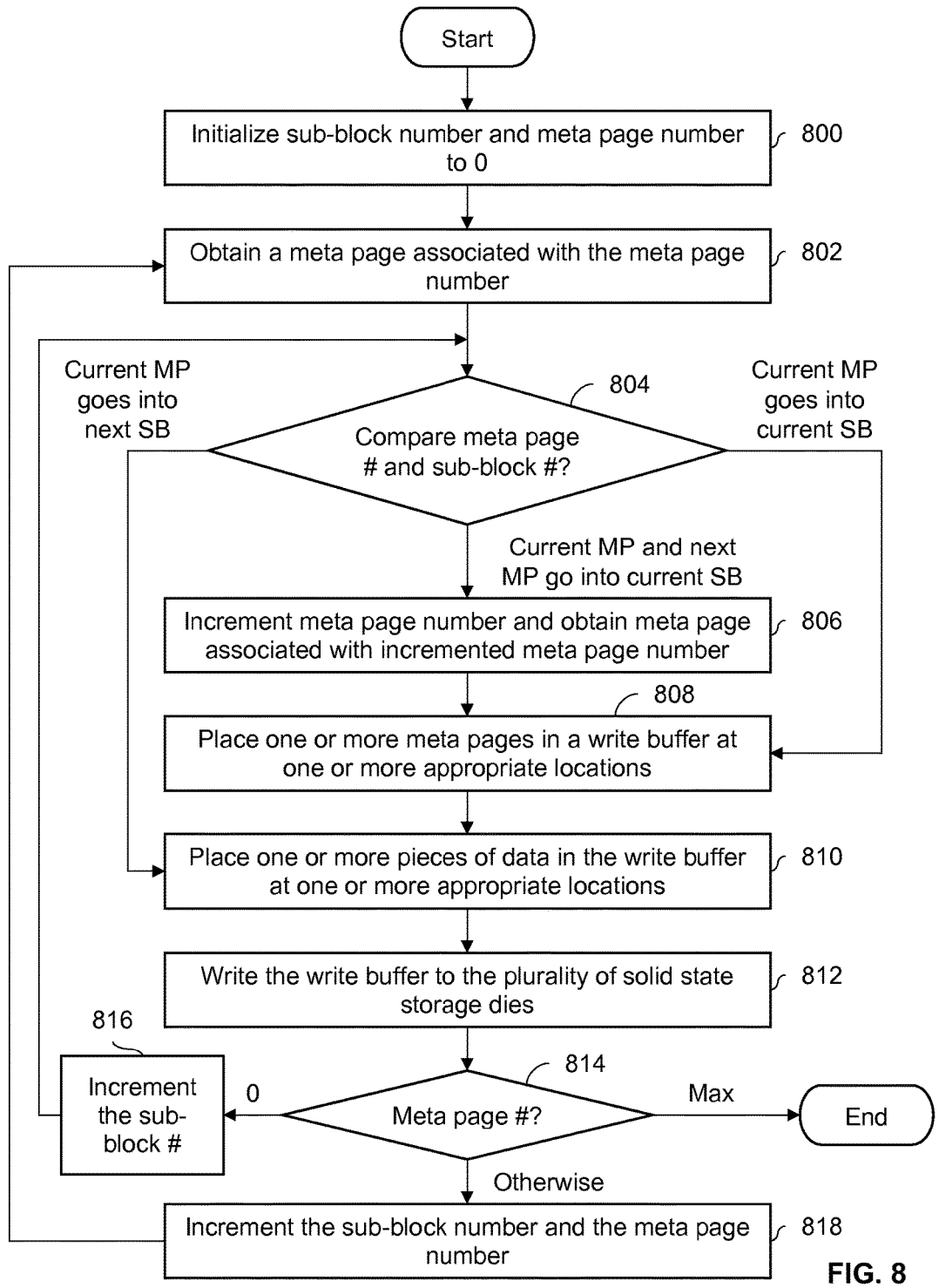
FIG. 8 is a flowchart illustrating an embodiment of a process for placing a meta data page within a write buffer when metadata is stored in a next sub-block (where applicable) and a striped pattern is used.

FIG. 8 is a flowchart illustrating an embodiment of a process for placing a meta data page within a write buffer when metadata is stored in a next sub-block (where applicable) and a striped pattern is used. FIG. 8 shows one example of the process performed by write buffer 406 in FIG. 4 when the meta page layout shown in FIG. 5 is used. In this example, the process is associated with a single super-block and the process may be repeated (e.g., as needed or desired) for each super-block. In the context of FIG. 1, in some embodiments the process shown in FIG. 8 is performed as part of step 104.

At 800, a sub-block number and a meta page number are initialized to 0. At 802, a meta page associated with the meta page number is obtained. For example, in FIG. 4, each meta page may be obtained by write buffer 406 from metadata generator 404. Metadata generator 404 may indicate to write buffer 406 via a variety of signaling techniques the meta page number for each meta page exchanged (e.g., a dedicated signal between the two blocks that indicates the meta page number, as part of some frame header, etc.).

At 804, the meta page number and the sub-block number are compared. If, based on the comparison at step 804, it is determined that the current meta page goes into a next sub-block, then one or more pieces of data are placed in the write buffer at one or more appropriate locations at 810. In the example of FIG. 5, if the meta page number is 0 and the sub-block number is 0, then the comparison at 804 would pass through this branch. If the write buffer comprises a 2×8 array, then data would be placed in all 16 positions, as is shown in sub-block 0 (502) in FIG. 5. For sub-block 1 (504), data would be placed in all locations except for the upper row, leftmost column. (Naturally, the write buffer may alternatively be configured as a one-dimensional data structure having 16 positions or locations.)

If, based on the comparison at step 804, it is determined that the current meta page goes into the current sub-block, then one or more meta pages are placed in a write buffer at one or more appropriate locations at 808. For example, if the sub-block number is one greater than the meta page number, then the comparison at 804 would pass through this branch. In FIG. 5, for the case where the sub-block number is 1 and the meta page number is 0 and the write buffer comprises a 2×8 array, then the sole meta page for that sub-block would be placed in the upper row, leftmost column (see, e.g., sub-block 1 (504) in FIG. 5).

If, based on the comparison at step 804, it is determined that the current meta page and the next meta page go into the current sub-block, then the meta page number is incremented and a meta page associated with the incremented meta page number is obtained at 806. In the example of FIG. 5, if the meta page number is 126 and the sub-block number is 127, then the comparison at 804 would pass through this branch.

After incrementing and obtaining at step 806 (or, as is described above, if it is determined at step 804 that the current meta page goes into the current sub-block), one or more meta pages are placed at step 808. After step 808 (or, as is described above, if it is determined at step 804 that the current meta page goes into a next sub-block), one or more pieces of data are placed at step 810. The write buffer is then written to the plurality of solid state storage dies at 812.

At 814 the meta page number is evaluated. If the meta page number is 0, then the sub-block number is incremented at 816 and the meta page number and the sub-block number are compared. For example, when the meta page number is 0, the corresponding meta page is not placed in sub-block 0, and so no new meta page needs to be obtained since the current one has not been placed within the write buffer.

If, at step 814, the meta page number is a maximum value (e.g., 127 in the example of FIG. 5), then the process ends. For example, suppose previously at the last iteration of step 806, the meta page number incremented from 126 to 127. For that meta page number, meta page 127 would be obtained (also at step 806), meta pages 126 and 127 would be placed in the write buffer at 808 (e.g., in the write buffer at positions corresponds to the positions shown in FIG. 5), and at 812 the write buffer would be written to the solid state storage devices. Then, the process would end because the maximum meta page number has been reached (as described above, the process may be repeated as desired for each super-block).

Otherwise (at step 814), the sub-block number and the meta page number are incremented at 818. This is the case, for example, when the sub-block number is one greater than the meta page number. A next meta page associated with the (incremented) meta page number is then obtained at step 802.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a storage controller configured to:
receive a plurality of data associated with a plurality of logical addresses, wherein: (1) the plurality of data is to be stored on a plurality of solid state storage dies and (2) each of the plurality of solid state storage dies is independently accessible and comprises a plurality of planes;
generate metadata that includes the plurality of logical addresses, wherein the metadata and the plurality of data sum to a super-block, wherein the super-block stores an amount of information that is less than a maximum amount of information that can be written to the plurality of solid state storage dies in a single write operation, the super-block comprises a plurality of sub-blocks; and
store the metadata and the plurality of data in a proper order, wherein the metadata and the plurality of data arranged in the proper order are written to the plurality of solid state storage dies, metadata of a sub-block is stored in a subsequent sub-block of the super-block and wrapping around to the first solid state storage die when the metadata of the sub-block reaches the last solid state storage die of the super block, and all of the metadata arranged in the proper order are read simultaneously in a single read operation.

2. The system of claim 1, wherein the storage controller includes a semiconductor device, including one or more of the following: an application-specific integrated circuit (ASIC) or a field-programmable gate array (FPGA).

3. The system of claim 1, wherein the super-block comprises same planes of each of the plurality of solid state storage dies, wherein the same planes of each of the plurality of solid state storage dies have same index numbers.

4. The system of claim 1, wherein the storage controller is configured to store the metadata in a same position within a sub-block.

5. The system of claim 1, wherein the storage controller is configured to store the metadata in a next sub-block.

6. The system of claim 1, wherein the proper order includes a striped pattern.

7. A method, comprising:
receiving a plurality of data associated with a plurality of logical addresses, wherein: (1) the plurality of data is to be stored on a plurality of solid state storage dies and (2) each of the plurality of solid state storage dies is independently accessible and comprises a plurality of planes;
generating metadata that includes the plurality of logical addresses, wherein the metadata and the plurality of data sum to a super-block, wherein the super-block stores an amount of information that is less than a maximum amount of information that can be written to the plurality of solid state storage dies in a single write operation, the super-block comprises a plurality of sub-blocks; and
storing the metadata and the plurality of data in a proper order, wherein the metadata and the plurality of data arranged in the proper order are written to the plurality of solid state storage dies, the storing the metadata in the proper order includes storing metadata of a sub-block in a subsequent sub-block of the super-block and wrapping around to the first solid state storage die when the metadata of the sub-block reaches the last solid state storage die of the super block, and all of the metadata arranged in the proper order are read simultaneously in a single read operation.

8. The method of claim 7, wherein the method is performed by a semiconductor device, including one or more of the following: an application-specific integrated circuit (ASIC) or a field-programmable gate array (FPGA).

9. The method of claim 7, wherein the super-block comprises same planes of each of the plurality of solid state storage dies, wherein the same planes of each of the plurality of solid state storage dies have same index numbers.

10. The method of claim 7, wherein storing the metadata includes storing the metadata in a same position within a sub-block.

11. The method of claim 7, wherein storing the metadata includes storing the metadata in a next sub-block.

12. The method of claim 7, wherein storing the metadata in the proper order includes storing the metadata using a striped pattern.

13. A non-transitory computer program product comprising:
a processor; and
a tangible computer readable storage medium coupled to the processor, embedding the non-transitory computer program product executed by the processor, including computer instructions suitable for:
receiving a plurality of data associated with a plurality of logical addresses, wherein: (1) the plurality of data is to be stored on a plurality of solid state storage dies and (2) each of the plurality of solid state storage dies is independently accessible and comprises a plurality of planes;
generating metadata that includes the plurality of logical addresses, wherein the metadata and the plurality of data sum to a super-block, wherein the super-block stores an amount of information that is less than a maximum amount of information that can be written to the plurality of solid state storage dies in a single write operation, the super-block comprises a plurality of sub-blocks; and
storing the metadata and the plurality of data in a proper order, wherein the metadata and the plurality of data arranged in the proper order are written to the plurality of solid state storage dies, the storing the metadata in the proper order includes storing metadata of a sub-block in a subsequent sub-block of the super-block and wrapping around to the first solid state storage die when the metadata of the sub-block reaches the last solid state storage die of the super block, and all of the metadata arranged in the proper order are read simultaneously in a single read operation.

14. The computer program product of claim 13, wherein the super-block comprises same planes of each of the plurality of solid state storage dies wherein the same planes of each of the plurality of solid state storage dies have same index numbers.

15. The computer program product of claim 13, wherein the computer instructions for storing the metadata include computer instructions for storing the metadata in a same position within a sub-block.

16. The computer program product of claim 13, wherein the computer instructions for storing the metadata include computer instructions for storing the metadata in a next sub-block.

17. The computer program product of claim 13, wherein the computer instructions for storing the metadata in the proper order include computer instructions for storing the metadata using a striped pattern.

* * * * *